United States Patent
Xu et al.

(10) Patent No.: US 11,347,988 B2
(45) Date of Patent: May 31, 2022

(54) METHOD AND DEVICE FOR CONFIGURING NFC SMART CARD

(71) Applicant: Xiaomi Digital Technology Co., Ltd., Beijing (CN)

(72) Inventors: Lina Xu, Beijing (CN); Yubo Chi, Beijing (CN); Zongqiang Chen, Beijing (CN)

(73) Assignee: Airstar Digital Technology Co., Ltd., Beijing (CN)

(*) Notice: Subject to any disclaimer, the term of this patent is extended or adjusted under 35 U.S.C. 154(b) by 0 days.

(21) Appl. No.: 16/744,738

(22) Filed: Jan. 16, 2020

(65) Prior Publication Data
US 2021/0133524 A1    May 6, 2021

(30) Foreign Application Priority Data
Oct. 31, 2019    (CN) .......................... 201911054895.6

(51) Int. Cl.
*G06K 19/06* (2006.01)
*G06Q 20/32* (2012.01)
*G06Q 20/34* (2012.01)

(52) U.S. Cl.
CPC ... *G06K 19/06196* (2013.01); *G06Q 20/3278* (2013.01); *G06Q 20/352* (2013.01); *G06Q 20/354* (2013.01)

(58) Field of Classification Search
CPC ................................................ G06K 19/06196
USPC ............................................................ 235/380
See application file for complete search history.

(56) References Cited

U.S. PATENT DOCUMENTS

| | | |
|---|---|---|
| 7,413,113 B1 | 8/2008 | Zhu |
| 7,644,859 B1 | 1/2010 | Zhu |
| 7,926,714 B1 | 4/2011 | Zhu |
| 8,123,128 B1 | 2/2012 | Zhu |
| 10,614,450 B1 * | 4/2020 | Templeton ........... G06Q 20/105 |
| 2013/0102246 A1 * | 4/2013 | Gagne ................. H04M 1/7253 |
| | | 455/41.1 |
| 2021/0099851 A1 | 4/2021 | Chen et al. |

FOREIGN PATENT DOCUMENTS

| | | |
|---|---|---|
| EP | 2 584 769 A1 | 4/2013 |
| JP | 2021-15623 | 2/2021 |

OTHER PUBLICATIONS

MIFARE4Mobile—Guidance Manual, Dec. 23, 2013, Retrieved from the Internet: URL:http://www.mifare4mobile.org/wp-content/uploads/2015/09/MIFARE4Mobile Guidance.2.1.pdf [retrieved on Nov. 4, 2015], 66 pages.
Supplementary European Search Report in the European application No. 20153390.8, dated Apr. 30, 2020.
Office Action dated Jul. 17, 2021, from The Intellectual Property of India in counterpart India Application No. 202044002847.

* cited by examiner

*Primary Examiner* — Rafferty D Kelly
(74) *Attorney, Agent, or Firm* — Finnegan, Henderson, Farabow, Garrett & Dunner, L.L.P.

(57) ABSTRACT

A method for configuring a Near Field Communication (NFC) smart card, includes: receiving a card selected by a user, the card being included in a card set corresponding to the user; determining at least one card which has no conflict with the selected card in the card set; adding the at least one card and the selected card in the NFC smart card, wherein each card in the NFC smart card is in an activated state.

15 Claims, 15 Drawing Sheets

METHOD AND DEVICE FOR CONFIGURING NFC SMART CARD

CROSS-REFERENCE TO RELATED APPLICATION

The present application is based upon and claims priority to Chinese Patent Application No. 201911054895.6, filed on Oct. 31, 2019, the content of which is hereby incorporated by reference in its entirety.

TECHNICAL FIELD

The present disclosure relates to the technical field of computer communication, and more particularly, to a method and device for configuring a Near Field Communication (NFC) smart card.

BACKGROUND

NFC, also called short-range wireless communication, is a high-frequency wireless communication technology for realizing contactless data transmission between devices. With the continuous improvement of NFC technology, the NFC technology is widely used in mobile devices. Based on an NFC module in the mobile device, a user may implement communication with an application of a card reading device when a screen turns off.

However, in the related art, there is no high-efficient configuration mode about an NFC smart card of an NFC chip in a mobile terminal, which may cause a low efficiency of configuring the NFC smart card and restrict an interaction efficiency that the mobile terminal performs wireless communication based on the NFC chip.

SUMMARY

In view of this, the present disclosure provides a method and device for configuring an NFC smart card, which may effectively improve an efficiency of configuring an NFC smart card.

According a first aspect of the embodiments of the present disclosure, a method for configuring an NFC smart card includes: receiving a card selected by a user, the card being included in a card set corresponding to the user; determining at least one card which has no conflict with the selected card in the card set, the at least one card being different from the selected card; and adding the at least one card and the selected card in the NFC smart card, wherein each card in the NFC smart card is in an activated state.

According a second aspect of the embodiments of the present disclosure, a device for configuring an NFC smart card includes: a processor; and a memory configured to store an instruction executable by the processor. The processor is configured to: receive a card selected by a user, the card being included in a card set corresponding to the user; determine at least one card which has no conflict with the selected card in the card set, the at least one card being different from the selected card; and add the at least one card and the selected card into the NFC smart card, each card in the NFC smart card being in an activated state.

According a third aspect of the embodiments of the present disclosure, a computer-readable storage medium has stored thereon a computer instruction that, when executed by a processor, implements the method in the first aspect.

The technical solutions provided in the embodiments of the present disclosure may have the following beneficial effects.

By determining at least one other card not having conflict relationship with the selected card in the card set, adding the card selected by the user and the at least one other card not having conflict relationship with the selected card in the NFC smart card, and making the cards included in the NFC smart card in the activated state in default, the electronic device may automatically invoke the cards in the NFC smart card to perform NFC interaction, thereby improving an interaction efficiency of the NFC.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the present disclosure and, together with the detailed description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A" and "an" in a singular form in the present disclosure and the appended claims are also intended to include a plural form, unless otherwise indicated. It is also to be understood that term "and/or" used in the present disclosure refers to and includes one or any or all possible combinations of multiple associated items that are listed.

It is to be understood that, although the terms "first," "second," "third," and the like may be adopted to describe various information in the present disclosure, the information should not be limited to these terms. These terms are only adopted to distinguish the information of the same type. For example, without departing from the scope of the present disclosure, first information may also be referred to as second information and, similarly, second information may also be referred to as first information. The term "if" used here may be explained as "while" or "when" or "responsive to determining," which depends on the context.

Figure 1A:
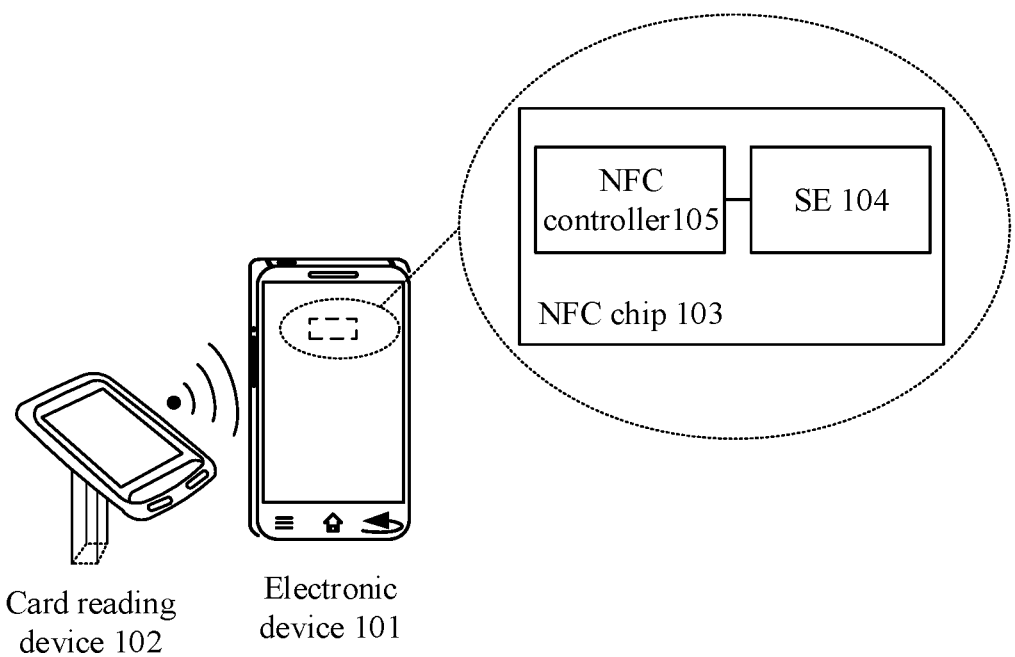
FIG. 1A is an application scenario diagram illustrating performing NFC interaction based on an NFC smart card according to an embodiment of the disclosure.

FIG. 1A is an application scenario diagram illustrating performing NFC interaction based on an NFC smart card according to some embodiments of the disclosure. As shown in FIG. 1A, an electronic device 101 and a card reading device 102 are included. An NFC chip 103 may be installed in the electronic device 101. The NFC chip 103 may include a Secure Element (SE) 104, or an Embedded Secure Element (ESE), an NFC controller 105, etc. A card set including at least one NFC smart card may be configured in the SE 104 (also referred to as a secure chip) or a storage element controlled by the SE 104. The SE 104 may also be integrated in an SIM card to be manufactured and sold by telecommunication operators, or on a Printed Circuit Board (PCB) of the electronic device, or in a Secure Digital (SD) card. When integrated on the PCB of the electronic device 101, the SE 104 may be independent of software or hardware of the electronic device 101.

A command received from an external reader, such as the card reading device 102, may be forwarded by a contactless communication front-end of the NFC chip 103 to the SE 104, then processed by the SE 104, and the processed result is replied through the NFC controller 105. The SE 104 in the electronic device 101 may manage at least one card belonging to a user based on an application program, and it can be understood that the SE 104 may have a complete CPU, ROM, EEPROM, RAM and I/O interfaces. Based on the needs of application, the SE 104 may also have a key algorithm processing function to support encryption and decryption of an algorithm, for example, DES, AES and RSA, and thus access control is enhanced, such that only the authenticated application can access the SE 104 and perform communication interaction. The SE 104 may also undertake security isolation for supporting data in the electronic device 101, so as to provide security and confidentiality.

The card reading device 102 may be equipped with an NFC card swiping system therein, so that the card reading device 102 performs NFC interaction with the electronic device 101 with the NFC card based on the NFC card swiping system. The NFC card swiping system equipped in the card reading device 102 may be a public transportation system, a payment system, an access control system, etc. The present disclosure does not limit the specific NFC card swiping system in the card reading device 102.

Figure 1B:
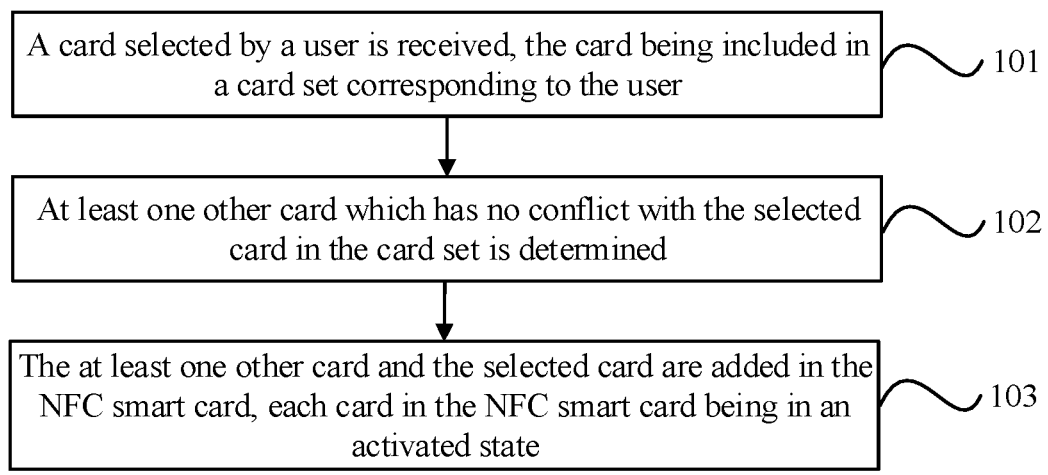
FIG. 1B is a flowchart illustrating a method for configuring an NFC smart card according to some embodiments of the disclosure.

FIG. 1B is a flowchart showing a method for configuring an NFC smart card according to an embodiment of the disclosure. As shown in FIG. 1B, the method may include the following operations.

In operation 101, a card selected by a user is received, the card being included in a card set corresponding to the user.

In an embodiment, the electronic device may automatically determine, according to an adding requirement of the user, a card to be added in the NFC smart card. For example, the electronic device may determine the card to be added in the NFC smart card according to adding rules preset by the user, and then add the determined card in the NFC smart card. Also for example, the user may send selection information for the card through the electronic device, and then the electronic device determines the card to be added in the NFC smart card based on the received selection information.

In another embodiment, the electronic device may determine the card to be added in the NFC smart card in the card set according to the applied scenario information. For example, the user may make the electronic device close to the card reading device; the electronic device acquires scenario information of the current scenario based on NFC communication with the card reading device, and then determines the card corresponding to the scenario information in the card set according to the acquired scenario information. Determination of information of the card to be added in the NFC smart card by means of interaction between the electronic device and the card reading device simplifies the user's operations, and thereby improves the accuracy of the electronic device in determining the card to be added in the NFC smart card.

In operation 102, at least one other card which has no conflict with the selected card in the card set is determined.

In an embodiment, all cards which have no conflict with the selected card in the card set are determined as the at least one other card that is different from the selected card.

In an embodiment, label information corresponding to the card set is acquired in the process of determining all cards which have no conflict with the selected card in the card set.

The label information may be generated by a server according to a contactless parameter of each card in the card set, and provided to the user. The label information is used for representing a conflicting state and/or a non-conflicting state between every two cards in the card set. It is determined whether there is conflict among the cards in the card set according to the label information. Because the label information represents the conflicting state, the non-conflicting state, or the conflicting state and the non-conflicting state between the cards in the card set, and the label information reflects whether the cards in the card set have the conflict relationship, the electronic device may determine at least one card which is in the non-conflicting state with the selected card according to the label information corresponding to the card set, and thus the electronic device may add at least two cards of the card set that have no conflict into the NFC smart card according to the label information.

For example, during determining at least one card having no conflict with the selected card in the card set, the conflicting state, or the non-conflicting state, or the conflicting state and the non-conflicting state between the cards in the card set may be determined according to the label information.

Furthermore, the label information may include at least one of the following: when the card selected by the user has no contactless parameter, the label information for representing that a card having no contactless parameter in the card set and the card selected by the user are in the non-conflicting state; when the card selected by the user has the contactless parameter, the label information for representing that the card of the card set having the same contactless parameter with that of the selected card and the card selected by the user are in the non-conflicting state; when the card selected by the user has no contactless parameter, the label information for representing that the card having a contactless parameter in the card set and the card selected by the user are in the conflicting state; and when the card selected by the user has the contactless parameter, the label information for representing that at least one card of the card set having a different contactless parameter from that of the selected card and the card selected by the user are in the conflicting state.

In an embodiment, the remaining cards except the selected card in the card set are displayed to the user. The card of the remaining cards that have a conflict with the selected card is set to be a non-selectable state; and the card selected by the user in the remaining cards is determined as the at least one other card in operation 102.

In operation 103, the at least one other card and the selected card are added in the NFC smart card, the cards included in the NFC smart card being in an activated state in default.

In an embodiment, after a card reading device and the electronic device complete communication, such as scenario interaction, the electronic device may feedback the card for performing the scenario interaction to the user, so that the user knows clearly the card for performing the scenario interaction according to the information fed back by the electronic device.

According to the above embodiments, at least one other card having no conflict with the selected card in the card set is determined, the card selected by the user and the at least one other card having no conflict with the selected card are added into the NFC smart card, and the cards included in the NFC smart card are made in the activated state. As a result, the electronic device may automatically invoke the cards in the NFC smart card to perform NFC interaction, thereby improving an interaction efficiency of the NFC.

Exemplary embodiments are illustrated below based on three main processes, which include: a server sends card information to the electronic device; the electronic device configures the NFC smart card based on the received card information; and performs switching of the NFC card.

In the first process, the server sends the card to the electronic device.

Differing from directly sending the card to the electronic device in the related art, in the present disclosure, the card to be sent is processed by the server. That is, the server determines a card set belonging to a card receiver user and the label information corresponding to the card set, and then sends the card set including the label information to the electronic device used by the receiver user, thereby improving the efficiency of the electronic device configuring the NFC smart card based on the cards in the sent card set. The process that the server sends the card to the electronic device will be elaborated below in combination with the accompanying drawings.

Figure 2A:
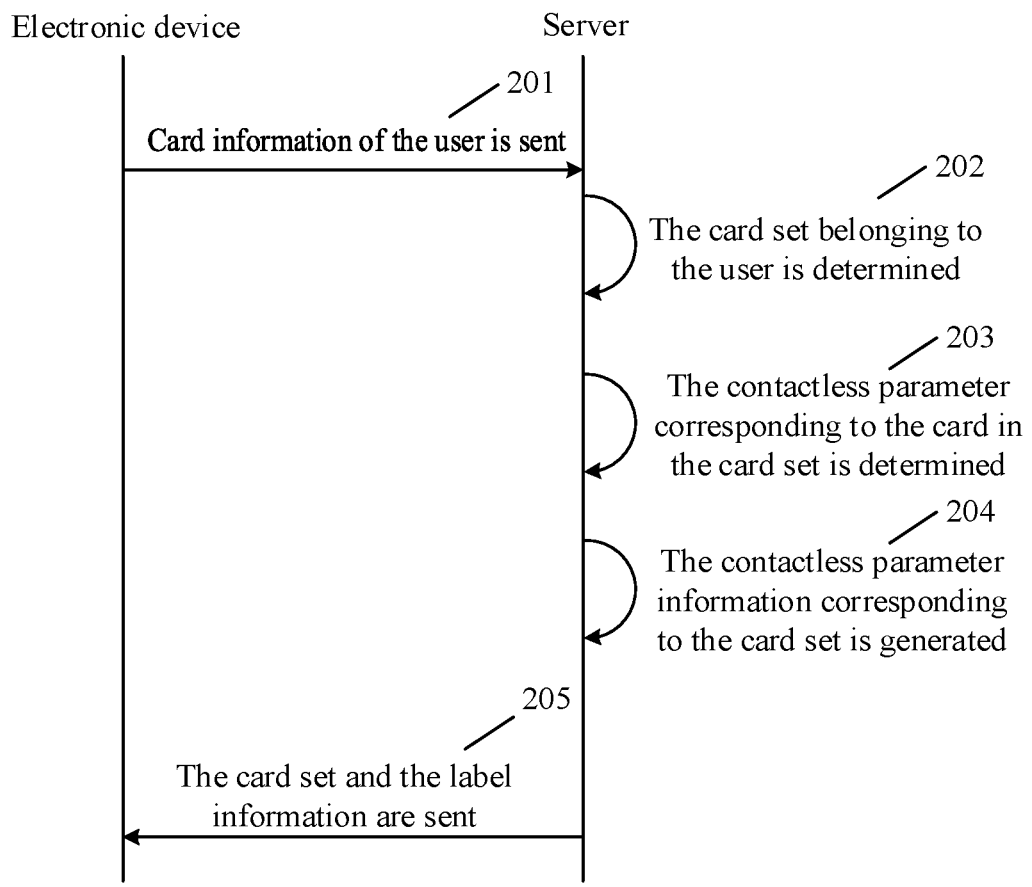
FIG. 2A is an interaction diagram illustrating a preprocessing method for configuring an NFC smart card according to an embodiment of the disclosure.

FIG. 2A is an interaction diagram illustrating a preprocessing method for configuring an NFC smart card, according to an embodiment of the disclosure. The method is applied to the server and may include the following operations.

In operation 201, the server receives card information of the user sent by the electronic device.

In an embodiment, the user may upload the card information of the card to the server through the used electronic device.

In an embodiment, the user inputs manually the card information to be uploaded in an application for managing the card set on the used electronic device, and then the electronic device uploads the card information input by the user to the server. The input card information may include a card number, information related to a card holder, and so on. The information related to the card holder may include contact information of the card holder, the name of the card holder, the ID number of the card holder, and so on.

Furthermore, the card number may be acquired by the user through a photographing function of the electronic device, and then the electronic device automatically identifies the card number corresponding to the card to be added based on the card number acquired by photographing. By acquiring a picture of the card number by means of the photographing function to determine the card number to be added based on real-time analysis of the acquired picture, user operations are simplified, and an efficiency of inputting the card number is improved.

In the inputting process, the user may preferentially determine a card type of the card to be uploaded, and then a card information inputting interface is entered. The card type may involve ID cards, ticket cards, etc. The ID cards may include a bank card, a refueling card, a parking card, a bus card, an access card, a membership card, a scorecard, etc. The ticket cards may include a plane ticket, a railway ticket, a discount coupon, a cinema ticket, etc.

Figure 2B:
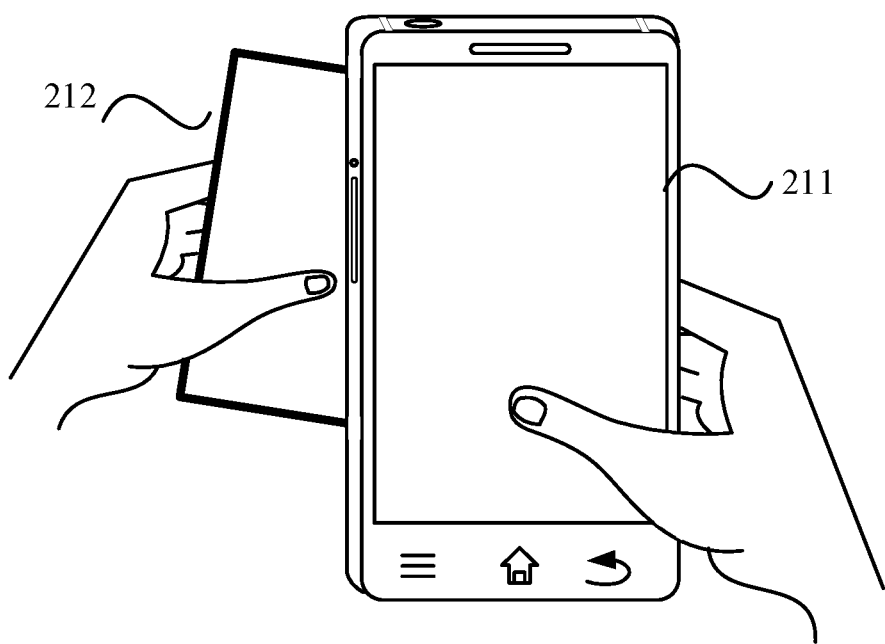
FIG. 2B is an application scenario diagram illustrating adding a card according to an embodiment of the disclosure.

In another embodiment, the electronic device may acquire, based on the NFC communication, card information of the card close to the electronic device, and thus send the acquired card information to the server. FIG. 2B is an application scenario diagram illustrating adding a new card according to an embodiment of the disclosure. The user may make a card 212 close to or lie against a designated area of an electronic device 211, and then the electronic device 211 acquires the card information to be uploaded based on the NFC communication. In this process, it not required for the user to manually input information in a card adding interface, and thus the efficiency of inputting the card information is improved.

Before and after the card information is acquired, prompt messages, such as "Please make the card close to the back of the device" and "Please hold on the card, trying to get the card information," may be fed back to the user in a display interface of the electronic device 211 used by the user. The progress of acquiring the information is fed back to the user through the prompt messages, so as to avoid the process that the electronic device 211 acquires the information to be interrupted by faulty operations.

In operation 202, the server determines the card set belonging to the user.

In an embodiment, the server may maintain the card set belonging to the same user. The cards in the card set, after being activated, may be uploaded to the server by the user through the used electronic device, and then the card information received in real time is maintained by the server, or periodically and dynamically configured in the server by the administrator based on a data file.

For example, the process that the server maintains the card set of the same user may be that application data related to the card is dynamically recorded. In an embodiment, the recorded application data may include the name of the user, the card number, and the date of activating the card. For some token information such as service provider authorization, the server may send the name of the card holder, the card number and other information of the received card to the service provider to acquire the token information returned by the service provider, and store the acquired token information associated with the card. In another embodiment, the server may only maintain identification information of the card, and information sent to the electronic device may only be the identification information of the card, so as to implement addition of the information related to the card based on interaction operations of the user in the process of adding the card in the NFC smart card.

In operation 203, the server determines the contactless parameter corresponding to the card in the card set.

In an embodiment, the contactless parameter of the card when installed in an SE may be determined as the contactless parameter of the card. For example, the contactless parameter of the card during installation may be determined based on configuration information of the card to be installed. Furthermore, the server may store a mapping relationship between the contactless parameters and the cards, and dynamically maintain the stored mapping relationship based on the configuration information corresponding to the cards.

In operation 204, the server generates the label information corresponding to the card set according to the determined contactless parameter.

The label information corresponding to the card set is generated based on the contactless parameter corresponding to the card in the card set, so that the conflicting state or the non-conflicting state, or the conflicting state and the non-conflicting state between the cards in the card set are reflected through the generated label information.

In an embodiment, all cards in the card set and their corresponding contactless parameters may be traversed, so as to determine one by one the card in the conflicting state or the non-conflicting state with each card in the card set.

For example, the conflicting state between the cards in the card set may be determined according to any one of the following rules: if the traversed card has no contactless parameter, the card, having no contactless parameter, in the card set is determined as one in the non-conflicting state with the traversed card; if the traversed card has no contactless parameter, the card, having the contactless parameter, in the card set is determined as one in the conflicting state with the traversed card; if the traversed card has the contactless parameter, the card, having the same contactless parameter as the traversed card, in the card set is determined as one in the non-conflicting state with the traversed card; and if the traversed card has the contactless parameter, the card, having a different contactless parameter from that of the traversed card, in the card set is determined as one in the conflicting state with the traversed card.

An exemplary manner of configuring the label information in the embodiment is illustrated below. In practical applications, the contactless parameter often involves parameter tag, parameter format, parameter type, etc. For illustration purposes, Parameter* is used below for representing the value of the contactless parameter. For example, the card set includes a card A, a card B, a card C, a card D and a card E, the contactless parameters of which respectively are Parameter1, Parameter2, Parameter1, no contactless parameter, and no contactless parameter. For the card A having contactless parameter Parameter1, the card C having the same contactless parameter Parameter1 is in the non-conflicting state with the card A, and the card B having the contactless parameter Parameter2, the card D and the card E having no contactless parameter are in the conflicting state with the card A. It is understood that for the card D having no contactless parameter, the card E also having no contactless parameter is in the non-conflicting state with the card D, and both the card A having the contactless parameter Parameter1 and the card B having the contactless parameter Parameter2 are in the conflicting state with the card D having no contactless parameter. Similarly, for the card B having the contactless parameter Parameter2, the card A and C both having the contactless parameter Parameter1, and the card D and the card E both having no contactless parameter are in the conflicting state with the card B.

In another embodiment, the cards may be classified based on whether there is the contactless parameter and the value of the contactless parameter corresponding to the card when there is the contactless parameter, and then the cards of the same category are uniformly marked as in the non-conflicting state, and the cards of different categories are marked as in the conflicting state.

For example, with regard to that the cards having no contactless parameter in the card set belong to the category of having no contactless parameter, correspondingly, label information for representing the non-conflicting state may be generated for the cards having no contactless parameter in the card set. Similarly, the label information for representing the non-conflicting state may be generated for the cards having the same contactless parameter in the card set. The label information for representing the conflicting state may be generated between the cards having different contactless parameters in the card set or between the card having the contactless parameter and the card having no contactless parameter.

The manner of setting the label information in the embodiment is illustrated in the following example: a card set consists of a card A having a contactless parameter Parameter1, a card B having a contactless parameter Parameter2, a card C having the contactless parameter Parameter1, a card D having no contactless parameter, and a card E having no contactless parameter. In the embodiment, the cards in the card set may be classified, namely divided into three categories: a category having no contactless parameter, a category having the contactless parameter Parameter1, and a class having the contactless parameter Parameter2. The category having no contactless parameter includes the card D and E, the category having the contactless parameter Parameter1 includes the card A and C, and the category having the contactless parameter Parameter2 includes the card B. Accordingly, the label information for representing the non-conflicting state is generated for the card D and E, and the label information for representing the non-conflicting state is generated for the card A and C, and the label information for representing the non-conflicting state is generated for the card B and A. The label information for representing the non-conflicting state between every two cards may also be generated for the card B, A, and D. The present disclosure does not limit the specific representation of the label information, and all representations of the label information which can represent the conflicting state or the non-conflicting state between the cards should fall within the protection scope of the present disclosure.

In operation 205, the server sends the card set and the label information corresponding to the card set to the electronic device used by the user.

In an embodiment, a card set and label information generated therefor may be sent to the electronic device used by the user, so that the electronic device adds at least two cards having no conflict in the card set into the NFC smart card according to the label information. For the cards having the same contactless parameter, because both the parameter type and the value of the card are the same, no conflict is generated between the cards during setting of configuration or application, and thereby NFC interaction may be performed based on the same smart card.

Through the above embodiments, label information corresponding to the card set that consists of the cards of the same user is generated by the server to label the cards about the conflicting state and/or the non-conflicting state in the card set, so that the electronic device of the user may receive the card set including the label information, and quickly determine the card in the non-conflicting state in the card set based on the label information without the need for the electronic device to analyze the cards in the card set and conflict relationship thereof, thereby improving the efficiency of configuring the electronic device.

Figure 3:
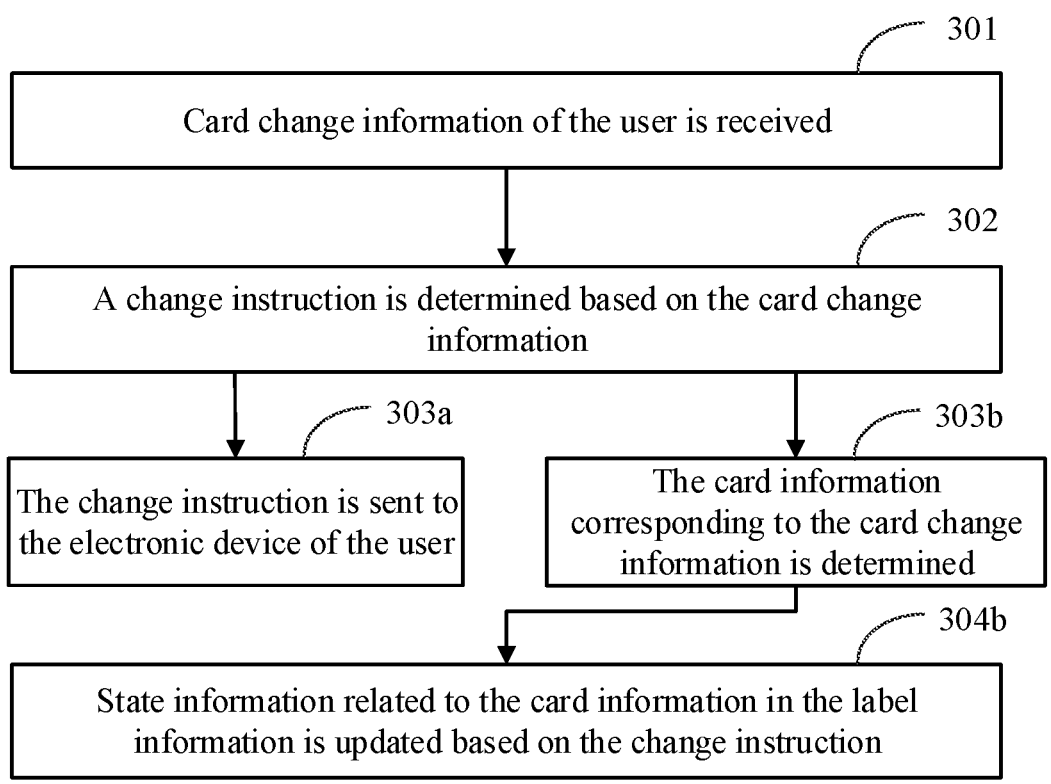
FIG. 3 is a flowchart showing a preprocessing method for configuring an NFC smart card according to an embodiment of the disclosure.

FIG. 3 is a flowchart showing a preprocessing method for configuring an NFC smart card according to an embodiment of the disclosure. As shown in FIG. 3, the method may include the following operations.

In operation 301, change information of card of the user is received.

In an embodiment, the user may manage, through a terminal, the cards of the card set belonging to the user, and send the change information generated after the management to the server through the terminal. For example, applications for managing the card set may be applications pre-installed before delivery, such as Mi-Pay and UnionPay, and the applications apply a virtual card solution based on the SE to implement NFC related functions; or the applications are application programs downloaded by the user from the application store. The user may change the cards in the card set through the applications in the terminal, and the specific change way may be, e.g., adding a card, deleting a card or changing the card information of the existing cards in the card set.

Figure 4:
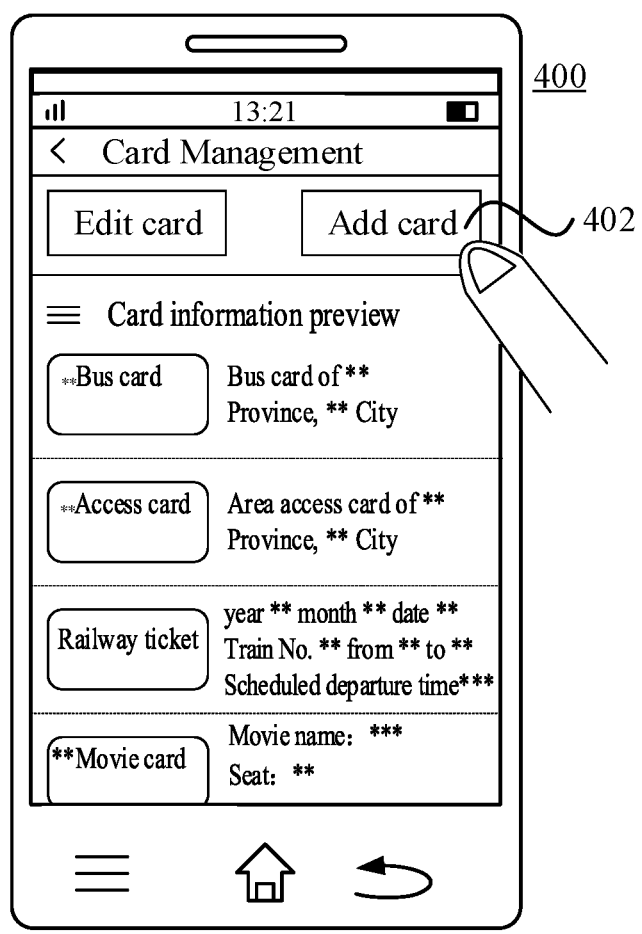
FIG. 4 is a schematic diagram illustrating an interactive interface of card management according to an embodiment of the disclosure.

The operation mode that the user changes the card is illustrated below in combination with the accompanying drawings. Taking the specific operation process of adding a card as an example, referring to FIG. 4, FIG. 4 is a schematic diagram illustrating an interactive interface 400 of card management according to an exemplary embodiment of the disclosure. As shown in FIG. 4, the user may trigger a card adding function of the application by clicking an addition identification or icon 402 in the interface 400, and then the interactive interface jumps to a card adding interface.

Figure 5A:
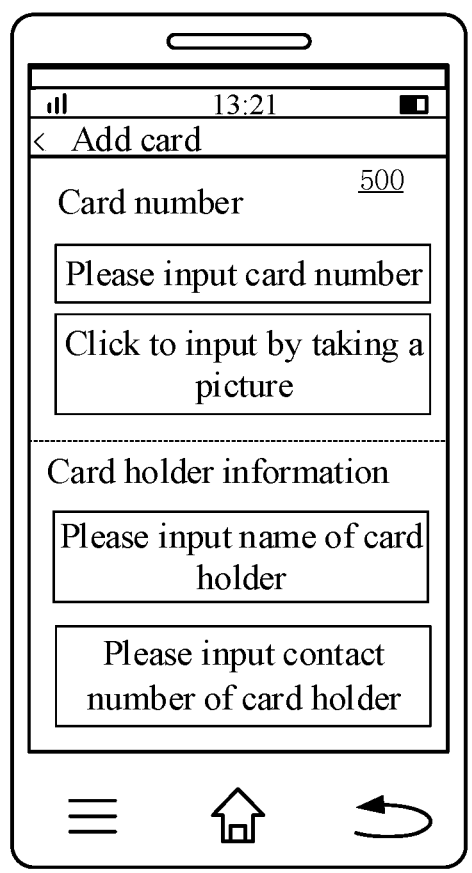
FIG. 5A is a schematic diagram of an interactive interface for adding a new card according to an embodiment of the disclosure.
Figure 5B:
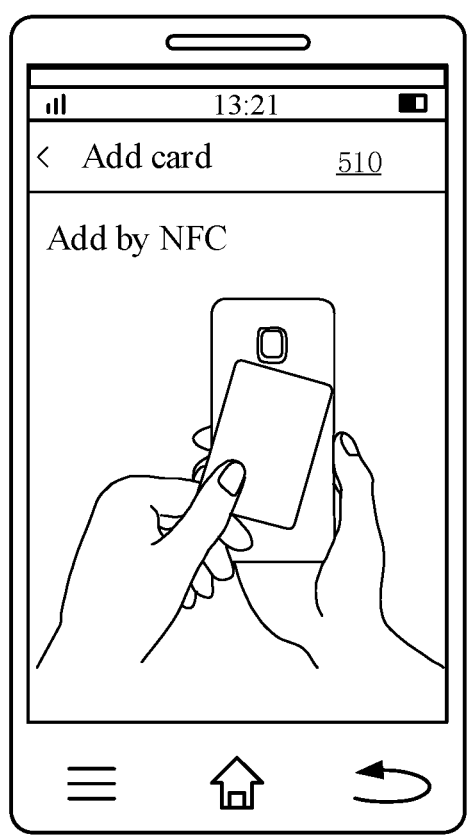
FIG. 5B is another schematic diagram of an interactive interface for adding a new card according to an embodiment of the disclosure.

The user may add a card through the card adding interface, and then the electronic device sends the added card to the server to enable the server to maintain the card set belonging to the user. Referring to FIGS. 5A and 5B, FIG. 5A is a schematic diagram of an interactive interface 500 for adding a card according to some embodiments of the disclosure. As shown in FIG. 5A, the user may input card information related to the card to be added in the interactive interface 500. For example, the user may preferentially select the card type of the card to be added, and then the card information inputting interface is entered. The card type may involve the ID cards, the ticket cards, etc. The ID cards may include the bank card, refueling card, parking card, bus card, access card, membership card, and a coupon, etc. The ticket cards may include the plane ticket, the railway ticket, the discount coupon, the cinema ticket, etc. The card information input by the user in the interactive interface 500 may include the card number, the information related to the card holder, and so on. The information related to the card holder may include the contact information of the card holder, the name of the card holder, the ID number of the card holder, and so on.

For the process that the electronic device acquires the card number, the picture with the card number may be obtained by means of the photographing function, and then the card number to be added is determined based on the real-time analysis of the obtained picture, so that the user's operations are simplified, and the efficiency of inputting the card number is improved.

In the process that the electronic device acquires the card information related to the card to be added, the electronic device may acquire the card information of the card close to (or lie against) the electronic device, so that the electronic device reads the card information of the card to be added based on the NFC chip. As shown in FIG. 5B, FIG. 5B is a schematic diagram of another interactive interface 510 for adding a card according to an embodiment of the disclosure. After jumping to the card adding interface, the electronic device may be triggered to enable an NFC communication function based on the NFC chip, and operation methods of adding a card, such as "Please make the card close to the back of the device" and "Please hold on, trying to get the card information," may be prompted in the interactive interface 510. The user makes the card close to the back of the terminal, and then the electronic device acquires the card information pre-stored in the chip of the card to be added based on the NFC communication, without the user to manually input in the card adding interface, and thus the efficiency of inputting the card information is improved.

Similarly, for the process of deleting the card or changing the card information of the existing card in the card set, the user may enter an interactive interface for displaying card, and delete the card or change the card information by triggering a function of editing the displayed card. In the process of changing the card information, the user may manually input the card information in the interactive interface, or attach the card information of which is to be corrected to the terminal, so that the terminal reads the card information to be corrected based on the NFC communication.

For improving an operating efficiency of deleting the card or changing the card information, when detecting that there is a card close to the terminal, the application program in the SE automatically acquires the information related to the card, such as the card number or the name of the card holder, and automatically compare the acquired card information with the information related to the card of the card set. Furthermore, the terminal may keep a background running state of the application which manages the card set, so that detection of the card close to the terminal is implemented when the terminal is in the interactive interface of any application.

The terminal may give feedback to the user based on a comparison result. When there is no card corresponding to the read card information in the card set, the terminal may feed back to the user the prompt message about whether to add a card, so that the user selects whether to add the card close to terminal in the card set. When there is a card corresponding to the read card information in the card set, the terminal may feed back different types of prompt messages based on the corresponding information to the card of the card set. For example, when information of the card close to the mobile phone corresponds to card holder information and card issuer information of the card in the card set, but does not correspond to the card number, the terminal may feed back the prompt message about whether to change the card number of the card to the user. When the information of the card close to the mobile phone is the same as the information of the card in the card set, the terminal may feed back the prompt message about whether to delete the card to the user. When only the card issuer information or the card holder information is the same, the terminal may feed back to the user the prompt message about whether to add a card.

Furthermore, the corresponding card change information may be generated based on a card change situation that the user changes the card set, and then the terminal sends the card change information to the server, so that the server obtains the card change situation that the user changes the card set.

Referring back to FIG. 3, in operation 302, a change instruction is determined based on the card change information.

The server may generate the corresponding change instruction for the received card change information. For example, if the card change information is card deletion information, a card deletion instruction corresponding to the card deletion information may be generated; and if the card change information is card addition information, a card addition instruction corresponding to the card addition information may be generated.

The card change information represented by the change instruction generated by the server may include change information of the card in the card set or label information corresponding to the changed card set. The server determines the changed card set according to the received card change information, and then determines the label information corresponding to the changed card set according to the contactless parameter corresponding to the card in the changed card set, so as to represent the conflicting state between the cards in the changed card set through the redetermined label information.

Instruction information may include the correspondence between the changed information and the change manner or the correspondence between the information before change and the information after change; or the instruction information may also include the information after change, such as the changed card set and the label information corresponding to the changed card set. As a result, upon receiving the change instruction, the electronic device may directly replace the card set pre-stored in the electronic device and the label information corresponding to the card set based on the instruction information in the change instruction. Delivering of change instruction via the instruction information will not be limited in the present disclosure.

In operation 303a, the change instruction is sent to the electronic device of the user, so that the electronic device updates the card set.

The server may send the generated change instruction to the electronic device used by the user, and upon receiving the change instruction, the electronic device adjusts the stored card set and the label information corresponding to the card set according to the change information corresponding to the change instruction.

Depending upon the instruction information in the change instruction, the electronic device receiving the change instruction may have multiple updating manners.

In an embodiment, the electronic device receiving the change instruction may read the instruction information in the change instruction to determine the information before change and the information after change, and then only the information corresponding to the information before change is updated in the electronic device, and the information, unrelated to the information before change that is recorded in the instruction information, is not to be changed. In an exemplary change process, the electronic device determines storage information corresponding to the acquired information before change, and then replaces the storage information in the electronic device with the information after change.

In another embodiment, the instruction information in the change instruction received by the electronic device may include the information before change and a change difference of the information before change. Similarly, the electronic device receiving the change instruction is not required to process other information unrelated to the information before change as mentioned in the instruction information, but only needs to process the change information related to the instruction information. In an exemplary procedure of processing change, the electronic device determines the storage information corresponding to the acquired information before change, and then changes the storage information according to the change difference of information before change in the instruction information, and replaces the storage information in the electronic device with the changed storage information.

In another embodiment, if the instruction information in the change instruction received by the electronic device includes the changed information, the electronic device may directly replace the storage information in the electronic device according to the changed information in the instruction information. For example, the electronic device may determine the changed card set in the instruction information and the label information corresponding to the changed card set, and then replace the corresponding information maintained in the electronic device with the determined changed card set and the label information corresponding to the changed card set.

In operation 303b, the card information corresponding to the card change information is determined.

In operation 304b, state information associated with the card information in the label information is updated based on the change instruction.

The server may update the label information corresponding to the maintained card set according to the received change information, and store the updated card set and the label information corresponding to the updated card set, so as to implement real-time update and maintenance of the card set of the user and the label information corresponding to the card set through the service side.

Through the above embodiments, the user may upload to the server the change information of the card set of the user through an electronic device, the server generates a card change instruction according to the acquired card change information, and then returns the card change instruction to the electronic device, so that the electronic device maintains the card set and the label information corresponding to the card set according to the received card change instruction, and meanwhile the server may update the card set and the label information corresponding to the card set maintained by itself according to the received change information. In such a manner, the server may maintain the card information belonging to the user and deliver the card change information in real time, the completeness of the card included in the card set in the electronic device used by the user is ensured, the user is not required to manually trigger the operation of updating the card set, and an efficiency of updating the card set and its corresponding label information is improved.

In the second process, the NFC smart card is configured.

For improving the usage efficiency of performing the NFC communication based on the NFC of the electronic device and simplifying the operation process of the user, in the present disclosure, the electronic device, upon receiving the card set and its corresponding label information sent by the server, may configure the card of the card set based on the label information corresponding to the card set.

For example, other cards being in the non-conflicting state with the selected card may be added in the NFC smart card based on the card selected by the user, so the efficiency of configuring the NFC smart card of the electronic device is improved. Furthermore, the user may participate in the NFC interaction of multiple scenarios based on the NFC smart card in the activated state without frequently switching the cards according to the application scenarios, thereby improving a scenario interaction efficiency of the electronic device. The process of configuring the NFC smart card in the present disclosure is elaborated below in combination with the specific embodiments.

Figure 6:
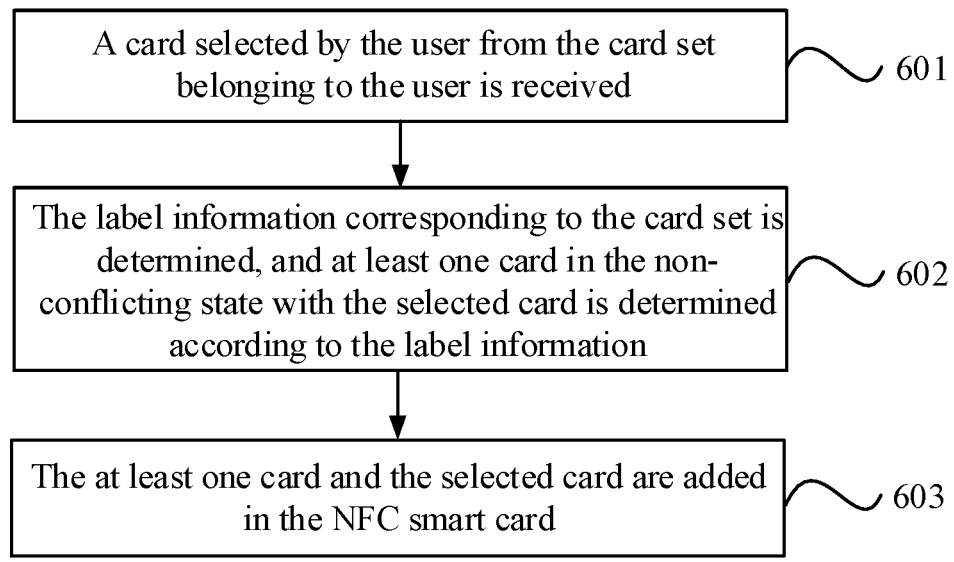
FIG. 6 is a flowchart illustrating a method for configuring an NFC smart card according to an embodiment of the disclosure.

FIG. 6 is a flowchart showing a method for configuring an NFC smart card according to some embodiments of the disclosure. The method may include the following operations.

In operation 601, a card selected by the user from the card set belonging to the user is received.

The card set and the label information corresponding to the card set are sent to the electronic device used by the user through the server, so that the electronic device may determine the card to be added in the NFC smart card according to the received card set and the label information corresponding to the card set.

In an embodiment, the electronic device may automatically determine the card to be added in the NFC smart card according to the adding requirement of the user. For example, selection information of the card sent by the user may be received by the electronic device. The selection information represents a usage requirement of the user for the card in the card set. The electronic device may determine the card selected by the user from the card set belonging to himself/herself according to the received selection information.

In another embodiment, the electronic device may determine the card to be added in the NFC smart card in the card set according to the application scenario information. For example, the user may make the electronic device close to the card reading device. The electronic device acquires the scenario information of the current scenario based on the NFC communication with the card reading device, and then determines the NFC card corresponding to the scenario information in the card set according to the acquired scenario information.

In operation 602, the label information corresponding to the card set is determined, and at least one card in the non-conflicting state with the selected card is determined according to the label information.

The electronic device may acquire the card set sent by the server and the label information corresponding to the card set. The label information is generated by the server according to the contactless parameter corresponding to the card in the card set. For example, the specific process that the server determines the contactless parameter of the card and generates the label information corresponding to the card set may refer to the illustration in the first process, and will not be repeated here.

The label information received by the electronic device represents the conflicting state or the non-conflicting state, or the conflicting state and the non-conflicting state between the cards in the card set. For example, the label information may include at least one of the following: when the card selected by the user has no contactless parameter, the label information for representing that the card, having no contactless parameter, in the card set and the card selected by the user are in the non-conflicting state; when the card selected by the user has a contactless parameter, the label information for representing that a card, having the contactless parameter, in the card set and the card selected by the user are in the non-conflicting state; when the card selected by the user has no contactless parameter, the label information for representing that a card, having a contactless parameter, in the card set and the card selected by the user are in the conflicting state; and when the card selected by the user has a contactless parameter, the label information for representing that at least one card, having a different contactless parameter from that of the selected card, in the card set and the card selected by the user are in the conflicting state.

The label information represents the conflicting state, or the non-conflicting state, or the conflicting state and the non-conflicting state between the cards in the card set. Since the label information reflects whether the cards in the card set have the conflict relationship, the electronic device may determine the card which is in the non-conflicting state with the selected card according to the label information corresponding to the card set, and thus the electronic device may add at least two cards of the card set that have no conflict into the NFC smart card according to the label information. Certainly, when there is no card in the non-conflicting state with the selected card in the card set, the electronic device may only add the card selected by the user in the NFC smart card.

In an exemplary implementation process, the electronic device may feed back to the user the situation of the card in the non-conflicting state determined according to the label information and the selected card, for example, by sending a prompt message or displaying the information related to the determined card in the device, so that the user knows the situation of the card to be added in the NFC smart card. The electronic device may determine, after receiving a confirmation message from the user, the card selected by the user and the other card in the non-conflicting state with the card selected by the user which is determined based on the card selected by the user and the label information corresponding to the card set as the cards to be added in the NFC smart card. Conversely, after receiving a cancellation message from the user, the electronic device may return from the interactive interface to an interface for the user to select the card in the card set, so that the user reselects the card in the card set, and then re-determines the card in the non-conflicting state with the selected card based on the card selected by the user and the label information corresponding to the card set.

After receiving the card selected by the user, the electronic device may display the remaining cards except the card selected by the user, so that the user continues to perform selection of card. Furthermore, the electronic device may determine the card in the conflicting state with the card selected by the user based on the card selected by the user and the label information corresponding to the card set, and feed back to the user the information of the card in the conflicting state with the selected card, so as to prompt the user that the card in the conflicting state cannot be selected and added in the NFC smart card.

For example, the electronic device may set a card of the remaining cards that has conflict relationship with the selected card to be the non-selectable state. For example, after receiving the information of the user selecting the card having the conflict relationship, the prompt message such as "The card is not selectable" is popped up, or the electronic device may only display the card that the user can select in the remaining cards, or the electronic device displays in black and white the card in the conflicting state with the selected card in the display interface, or the electronic device adds a non-selectable tag to the card in the conflicting state with the card selected by the user, so as to improve the efficiency of the user identifying the non-selectable card.

The electronic device receives the selection information that the user selects the card in a user-selectable state from the remaining cards, determines the card corresponding to the received selection information as the card selected by the user, and takes the selected card as the card to be added in the NFC smart card. Similarly, the electronic device may display the remaining cards except the card selected by the user, determine the card having the conflict relationship with the selected card in the rest cards based on the card selected by the user, and then determine the card having the conflict relationship with the selected card in the remaining cards to be the non-selectable state. Likewise, the electronic device may pop up the prompt message such as "The card is not selectable"; or the electronic device may only display the card selectable for the user in the remaining cards. The manner of prompting the non-selectable card in the remaining cards will not be repeated here.

In operation 603, the at least one card and the selected card are added in the NFC smart card.

The electronic device adds the card selected by the user and the determined at least one other card in the non-conflicting state with the selected card into the NFC smart card. The selected card and the other card in the NFC smart card are in the activated state, so that the user may perform interaction based on the card added in the NFC smart card of the electronic device in the process of performing NFC interaction with the card reading device.

The process of adding the card in the NFC smart card may be implemented in a plurality of manners. In an embodiment, the electronic device may determine scenario token information corresponding to the received card, and then add the determined scenario token information in the NFC smart card, so that in the process that the electronic device performs interaction based on the NFC smart card, the card reading device only needs to perform authorization of interaction based on the scenario token information sent by the electronic device through the NFC communication, thereby improving the authorization efficiency.

In another embodiment, the electronic device may receive the card information of the card to be added input by the user, and then upload the received card information of the card to be added to the server, so that the server maintains the card information input by the user, and adds the received information related to the card input by the user in the card set sent by the electronic device of the user. In the process of configuring the NFC smart card, the electronic device may add the card information received from the server into the NFC smart card, so that the card reading device may authenticate the card information acquired based on the NFC communication in the process that the electronic device performs interaction by using the NFC smart card.

Through the above embodiments, the electronic device may receive the card set and the label information corresponding to the card set from the server, determine at least one other card in the non-conflicting state with the selected card according to the label information, and then add the card selected by the user and the determined at least one other card into the NFC smart card. The process simplifies the operations of the user, and improves the interaction efficiency of the user performing the NFC based on the NFC card of the electronic device.

In the third process, switching between the NFC cards is performed.

When the NFC smart card cannot be used for interaction or the user has a requirement for other non-smart NFC cards except the NFC smart card, the user may redetermine the non-smart NFC card from the card set to perform the NFC interaction through the electronic device, so as to satisfy an application requirement of the user for performing the NFC interaction based on different NFC cards in the same application scenario.

Figure 7:
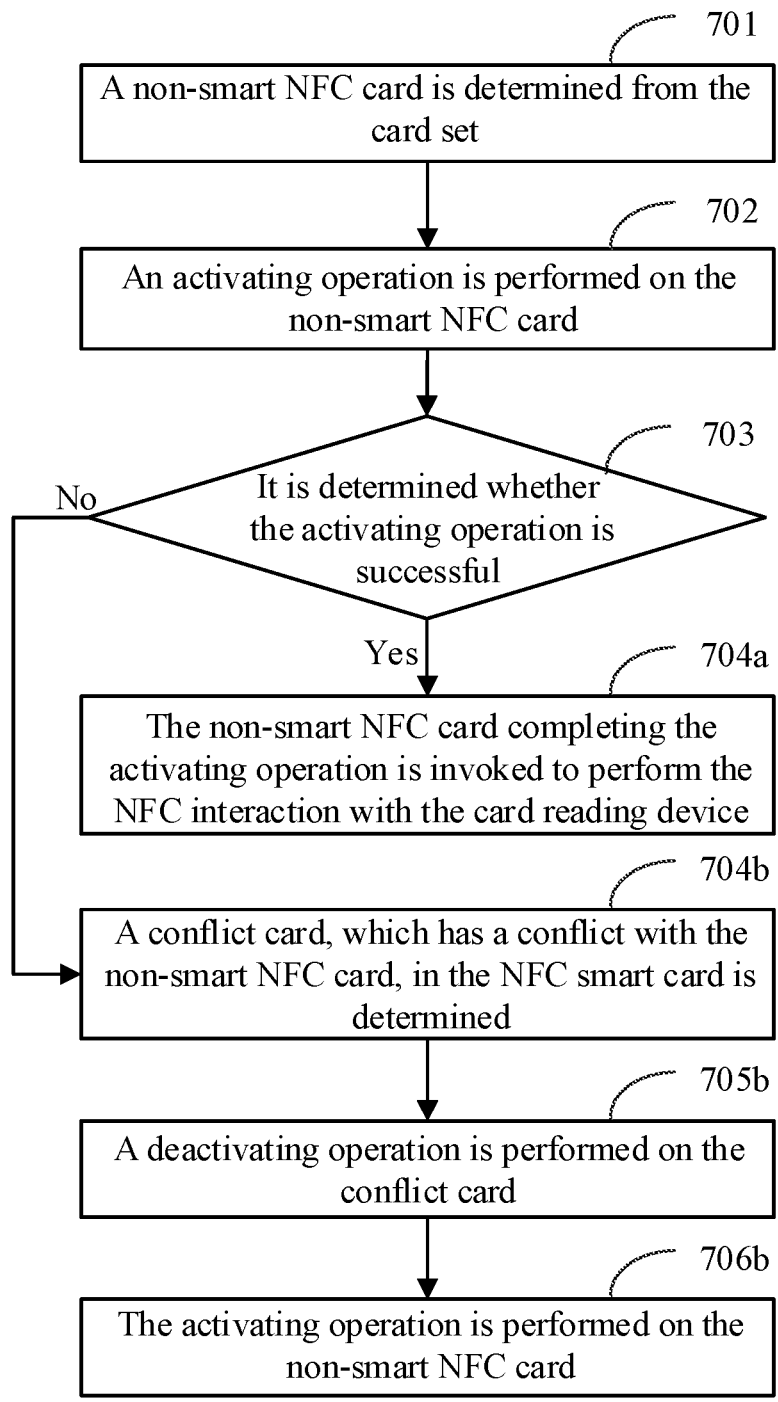
FIG. 7 is a flowchart illustrating a method for switching an NFC card according to an embodiment of the disclosure.

FIG. 7 is a flowchart showing a method for switching an NFC card according to some embodiments of the disclosure. The method may include the following operations.

In operation 701, a non-smart NFC card is determined from the card set.

Virtual card information maintained by the NFC chip in the electronic device may be divided into smart NFC cards (also referred to as NFC smart cards) and non-smart NFC cards. The smart NFC cards include the card selected by the user and the card in the non-conflicting state with the card selected by the user. The card in the NFC smart card is in the activated state in default, and the non-smart NFC cards, not set in the NFC smart cards, are in the inactivated state.

There may be multiple trigger manners of determining the non-smart NFC card from the card set. In an embodiment, the user may select the NFC card to be switched through the electronic device; the electronic device receives the selection information of the user selecting the NFC card and generates a switch instruction based on the selection information of the NFC card; and then the NFC chip determines the NFC card corresponding to the switch instruction as the non-smart NFC card determined from the card set.

In another embodiment, after sending the switch instruction through the electronic device, the user may make the electronic device close to the card reading device to acquire the current scenario information such as the scenario identification information through the NFC communication, and then the electronic device automatically determines the non-smart NFC card corresponding to the scenario information in the card set according to the acquired scenario information.

For example, if there is only one non-smart NFC card corresponding to the scenario information in the card set, the electronic device may directly determine the non-smart NFC card as the non-smart NFC card determined from the card set; if there are multiple non-smart NFC cards corresponding to the scenario information in the card set, the electronic device may feed back the multiple non-smart NFC cards corresponding to the scenario information to the user, for example, by displaying the non-smart NFC cards corresponding to the scenario information in the display interface of the electronic device, or by sending the information related to the non-smart NFC cards corresponding to the scenario information to the user, so that after the user selects by touching an NFC card in the display interface or responds to the information corresponding to the received non-smart NFC cards, the electronic device acquires selection information on the multiple non-smart NFC cards corresponding to the scene information, and then determines the non-smart NFC card corresponding to the received selection information as the non-smart NFC card corresponding to the scenario information in the card set.

In yet another embodiment, when determining that the number that performing communication interaction based on the smart NFC card fails exceeds a threshold, the electronic device automatically determines, according to a scenario identification corresponding to the communication interaction, the NFC card corresponding to the scenario identification and not included in the NFC smart card as the non-smart NFC card.

For example, the user makes the electronic device close to the card reading device. When the interaction between the electronic device and the card reading device based on the NFC communication is started, the electronic device may make statistics to the number of generating abnormal communication interaction information. For example, when the number of the received abnormal communication interaction information exceeds a threshold, the electronic device may determine the scenario information of the current communication interaction based on a cache record, so as to determine the NFC card corresponding to the scenario identification and not included in the NFC smart card as the non-smart NFC card.

In operation 702, an activating operation for the non-smart NFC card is performed.

In operation 703, it is determined whether the activating operation is successful; if so, operation 704a is executed; and otherwise, operation 704b is executed.

For the non-smart NFC card obtained upon determination, the electronic device may activate the determined non-smart NFC card, so that the electronic device may perform communication interaction with the card reading device according to the activated non-smart NFC card.

In operation 704a, when a response message of successful activation is received, the non-smart NFC card being activated is used by the electronic device to perform NFC interaction with the card reading device. The response message of successful activation indicates that the non-smart NFC card does not conflict with all the cards included in the smart NFC card.

In operation 704b, when a response message of failed activation is received, a card having conflict with the non-smart NFC card is determined in the NFC smart card.

In operation 705b, a deactivating operation is performed on the conflict card.

In an embodiment, information of the conflict card on which the deactivating operation is performed may be recorded, so as to recover the conflict card from a deactivated state to an activated state based on the recorded information when the deactivating processing is completed on the non-smart NFC card on which the activating processing has been completed.

In operation 706b, when the conflict card is switched from the activated state to the inactivated state, the activating operation is performed on the non-smart NFC card.

In an embodiment, the deactivating processing is performed on the non-smart NFC card on which the activating processing is completed upon reception of at least one of the following instruction information: instruction information of switching the card, instruction information of exiting current page for swiping card, and instruction information of completing the NFC interaction.

After the NFC interaction based on the non-smart NFC card is completed, the user may click a key of triggering exit of an interactive interface, so that the interactive interface based on the non-smart NFC card is exited. The key of triggering exit of the interactive interface may be a virtual key or a physical key in the electronic device.

Similarly, when the user requires to change the non-smart NFC card for performing the NFC interaction, the user may click a key capable of triggering a card switching function to switch the current non-smart NFC card into the other card in the card set. For example, after the switch instruction sent by the user through the electronic device is received, the electronic device may recover the activated state of the card in the NFC smart card, so that the electronic device may perform the NFC interaction based on the NFC smart card.

In addition, the electronic device may automatically perform the deactivating operation on the non-smart NFC card based on the instruction information of completing the NFC interaction, so as to improve the efficiency of the electronic device performing the deactivating processing on the non-smart NFC card.

In another embodiment, after the deactivating processing is completed on the non-smart NFC card, the electronic device may automatically perform the activating operation process of recovering the smart NFC card, so as to keep a real-time response requirement of the user to the smart NFC card during use. Thus, the efficiency of the electronic device responding to the NFC communication is improved.

In yet another embodiment, after completing the scenario interaction with the card reading device, the electronic device may feed back the card for the scenario interaction to the user, so that the user of the electronic device can know clearly the card for interaction. For example, after completing the scenario interaction with the card reading device, the electronic device may give prompt by means of, for example, an application notification or a short message, or displaying information of the card for interaction on the terminal capable of representing card identification, such as a card face and the name of the card issuer.

In still another embodiment, at least one smart NFC card is included in the NFC smart card. When the electronic device performs NFC interaction with the card reading device based on the NFC smart card, a communication effect equivalent to performing the NFC interaction with the card reading device based on the corresponding smart NFC card in the NFC smart card may be realized, and thus the electronic device may implement the NFC interaction in multiple scenarios based on the NFC smart card without switching the card according to the specific scenario in the multiple scenarios, and the interaction efficiency of the NFC is thereby improved.

For example, the card set belonging to the user A includes bus card a, bus card b, bus card c, and bank card d. Only the bus card a and the bank card d are configured in the smart NFC card, and thus the smart NFC card is the bus card a and the bank card d, and the non-smart NFC card is the bus card b and the bus card c. During use, when the user takes a bus, an effect of swiping the bus card a is achieved based on interaction between the smart NFC card and the card reading device of bus card; the effect of paying by swiping the bank card d is achieved for the user based on interaction between the smart NFC card and the bank card reading device that supports the NFC.

Based on the actual user requirement, the non-smart NFC card in the card set can be switched for the user to perform communication interaction. For example, the user A may determine to use the non-smart NFC card (i.e., the bus card b) in the card set to perform interactive communication, and correspondingly, the electronic device performs the activating operation for the bus card b as the non-smart NFC card. When the response message of successful activation is received, the electronic device uses the bus card on which the activating operation is completed to perform the NFC interaction.

Through the above embodiments, the electronic device may determine the non-smart NFC card to be activated from the card set according to the user requirement, and then perform the activating operation on the non-smart NFC card; and the electronic device may also perform the NFC interaction according to the activated non-smart NFC card, which realizes the flexibility of changing the card for NFC interaction, and satisfies the requirement of the user for performing communication based on different cards.

The foregoing method embodiments are described as a series of combinations of actions, but it should be appreciated by those skilled in the art that the present disclosure is not limited to the described sequence of actions, and the operations may be executed in a different sequence or performed simultaneously.

Corresponding to the above method embodiments for implementing application functions, the present disclosure also provides a device for implementing the application functions.

Figure 8:
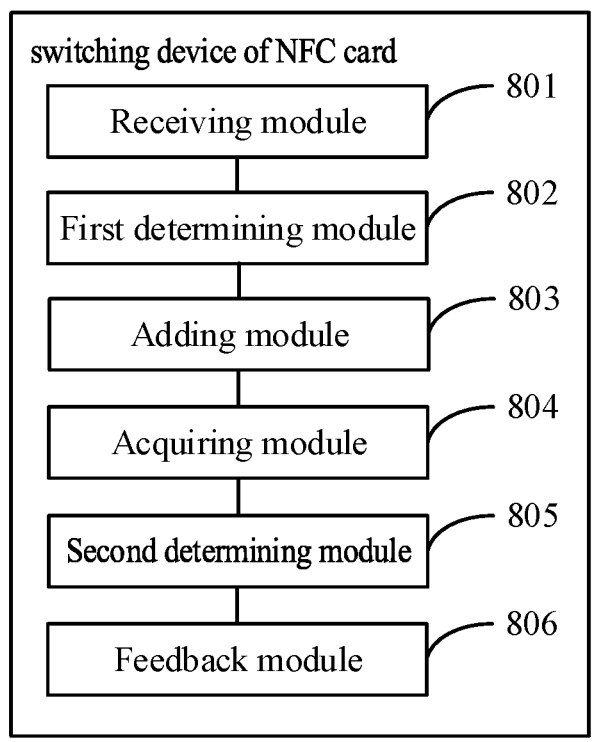
FIG. 8 is a block diagram of a device for configuring an NFC smart card according to an embodiment of the disclosure.

FIG. 8 is a block diagram of a device for configuring an NFC smart card according to some embodiments of the disclosure. Referring to FIG. 8, the device may include a receiving module 801, a first determining module 802, and an adding module 803.

The receiving module 801 is configured to receive a card selected by the user, the card being included in a card set corresponding to the user.

The first determining module 802 is configured to determine at least one other card which has no conflict with the selected card in the card set.

The adding module 803 is configured to add the at least one other card and the selected card into the NFC smart card, the cards included in the NFC smart card being in the activated state in default.

In an embodiment, the device further includes: an acquiring module 804, and a second determining module 805.

The acquiring module 804 is configured to acquire label information corresponding to the card set, the label information being used for representing a conflicting state and/or a non-conflicting state between the cards in the card set.

The second determining module 805 is configured to determine whether there is conflict between the cards in the card set according to the label information.

In some embodiments, the label information is generated by a server according to contactless parameter of the cards included in the card set, and provided to the user.

In an embodiment, the label information includes at least one of the following:

when the card selected by the user has no contactless parameter, the label information for representing that the card having no contactless parameter in the card set and the card selected by the user are in the non-conflicting state;

when the card selected by the user has the contactless parameter, the label information for representing that the card having the same contactless parameter in the card set and the card selected by the user are in the non-conflicting state;

when the card selected by the user has no contactless parameter, the label information for representing that the card having a contactless parameter in the card set and the card selected by the user are in the conflicting state; and when the card selected by the user has a contactless parameter, the label information for representing that the cards having different contactless parameters from the selected card in the card set and the card selected by the user are in the conflicting state.

In an embodiment, the device further includes: a feedback module 806, configured to feed back the card for the scenario interaction to the user after performing the scene interaction between the electronic device and the card reading device.

Figure 9:
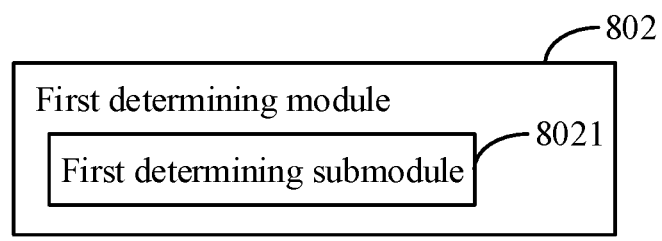
FIG. 9 is a block diagram of a device for configuring an NFC smart card according to an embodiment of the disclosure

FIG. 9 is a block diagram of a device for configuring an NFC smart card according to some embodiments of the disclosure. The embodiment is based on the embodiment in FIG. 8. The first determining module 802 may include: a first determining submodule 8021.

The first determining submodule 8021 is configured to determine all cards of the card set that have no conflict with the selected card as the at least one other card.

Figure 10:
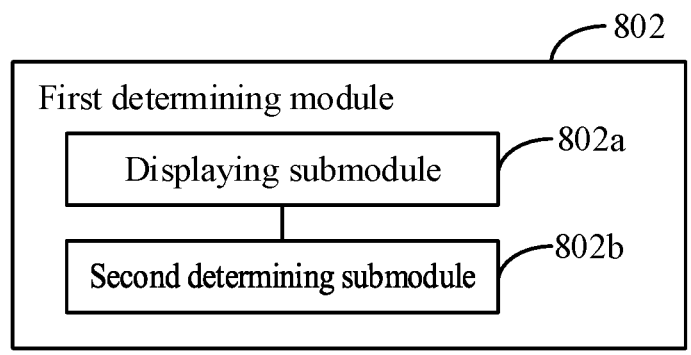
FIG. 10 is a block diagram of a device for configuring an NFC smart card according to an embodiment of the disclosure.

FIG. 10 is a third block diagram of a device for configuring an NFC smart card according to an embodiment of the disclosure. The embodiment is based on the embodiment shown in FIG. 8. The first determining module 802 may include: a displaying submodule 802*a* and a second determining submodule 802*b*.

The displaying submodule 802*a* is configured to display to the user the remaining cards except the selected card in the card set. The card, having the conflict with the selected card, in the remaining cards is set to be a non-selectable state.

The second determining submodule 802*b* is configured to determine the card selected by the user in the remaining cards as the at least one other card.

Figure 11:
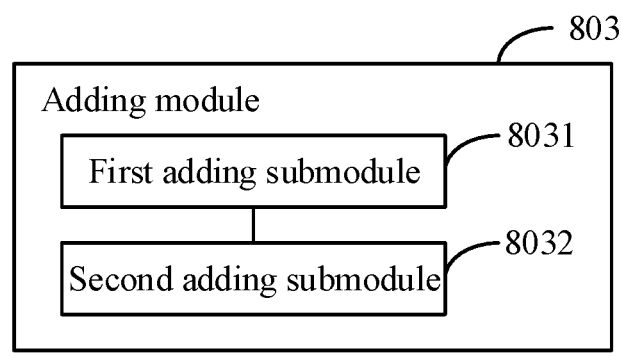
FIG. 11 is a block diagram of a device for configuring an NFC smart card according to an embodiment of the disclosure.

FIG. 11 is a block diagram of a device for configuring an NFC smart card according to an embodiment of the disclosure. The embodiment is based on the embodiment shown in FIG. 8. The adding module 803 may include: a first adding submodule 8031 and the second adding submodule 8032.

The first adding submodule 8031 is configured to determine the scenario token information corresponding to the card to be added, and add the scenario token information in the NFC smart card of the user.

The second adding submodule 8032 is configured to receive the card information of the card to be added input by the user, and add the card information in the NFC smart card of the user.

The device embodiments basically correspond to the method embodiments, and thus reference can be made to the description of the device embodiments for related parts. The device embodiments described above are only exemplary, modules described as separate parts therein may or may not be physically separated, and parts displayed as modules may be located in the same place or may also be distributed to multiple networks. Part or all of the modules therein may be selected according to a practical requirement.

Embodiments of the present disclosure provide an electronic device, which includes: a processor; and a memory configured to store an instruction executable by the processor. The processor is configured to perform the above described methods.

Figure 12:
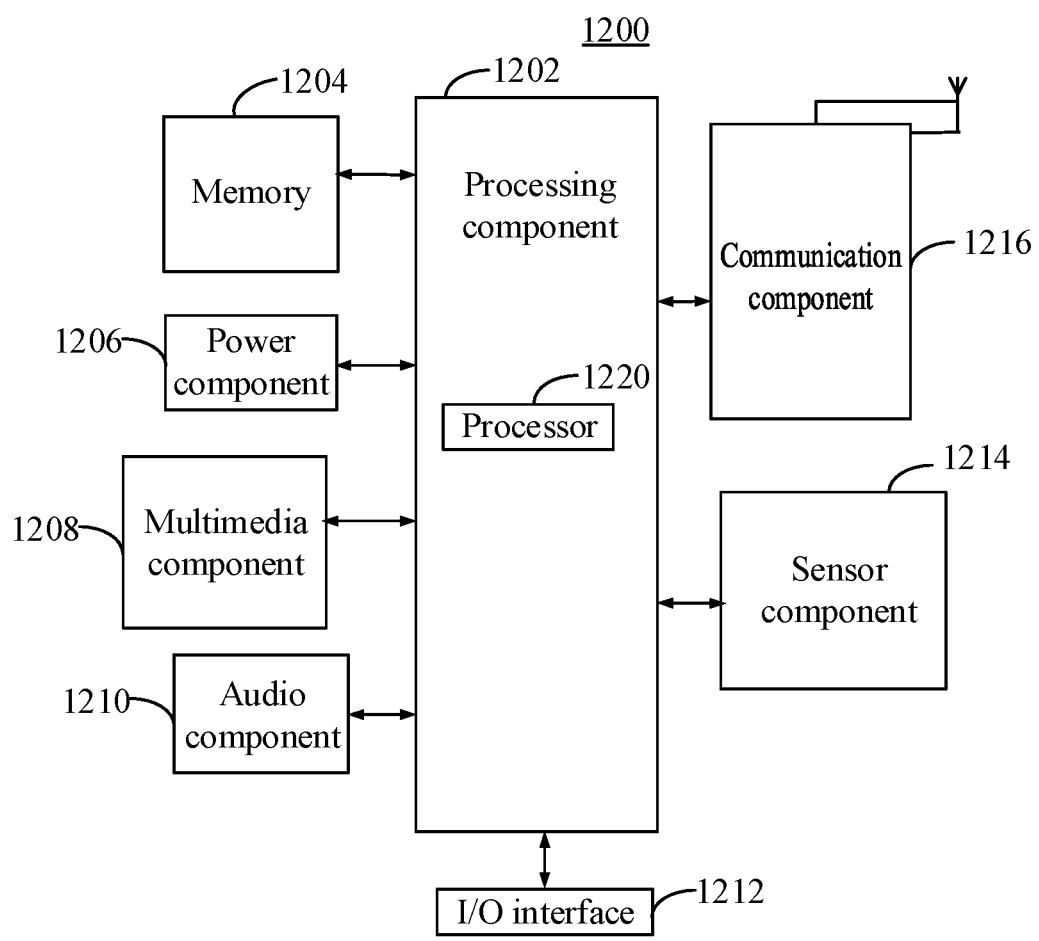
FIG. 12 is a block diagram of a device for configuring an NFC smart card according to some embodiments of the disclosure.

FIG. 12 is a block diagram of a device 1200 for switching an NFC card according to an embodiment of the disclosure. For example, the device 1200 may be user equipment, such as a mobile phone, a computer, a digital broadcast terminal, a messaging device, a gaming console, a tablet, a medical device, exercise equipment, a personal digital assistant (PDA), and wearable devices such as a smart watch, intelligent glasses, a smart bracelet, and smart running shoes.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the operations in the above method. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operations of the device 1200. Examples of such data include instructions for any application programs or methods operated on the device 1200, contact data, phonebook data, messages, pictures, video, etc. The memory 1204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensor may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and a peripheral interface module. The peripheral interface module may be a keyboard, a click wheel, a button, etc. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (WiFi) network, a 4th-Generation (4G) or 5th-Generation (5G) network or a combination thereof. In an exemplary embodiment, the communication component 1216 receives a broadcast signal or broadcast associated information from an external broadcast management system through a broadcast channel. In an exemplary embodiment, the communication component 1216 further includes an NFC module to facilitate short-range communication. In an exemplary embodiment, the communication component 1216 may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above method.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for configuring a Near Field Communication (NFC) smart card, comprising:
receiving a card selected by a user, the card being included in a card set corresponding to the user;
acquiring label information corresponding to the card set, wherein the label information represents at least one of a conflicting state or a non-conflicting state between every two cards in the card set, and wherein the label information is generated by a server according to contactless parameters of cards in the card set and is sent to an electronic device hosting the NFC smart card;
determining, according to the label information sent by the server, whether there is a conflict between every two cards in the card set;
determining at least one card which has no conflict with the selected card in the card set, the at least one card being different from the selected card; and
adding the at least one card and the selected card into the NFC smart card, wherein each card in the NFC smart card is in an activated state,
wherein receiving the card selected by the user comprises:
acquiring scene information of a present scene based on NFC communication between the electronic device hosting the NFC smart card and a card reading device, and determining a card corresponding to the scene information in the card set according to the acquired scene information as the selected card.

2. The method of claim 1, wherein the label information further comprises at least one of:
when the card selected by the user has a contactless parameter, label information for representing that a card having the contactless parameter in the card set and the card selected by the user are in the non-conflicting state;
when the card selected by the user has a contactless parameter, label information for representing that a card having a different contactless parameter from the contactless parameter in the card set and the card selected by the user are in the conflicting state;
when the card selected by the user has no contactless parameter, label information for representing that a card having no contactless parameter in the card set and the card selected by the user are in the non-conflicting state; or
when the card selected by the user has no contactless parameter, label information for representing that a card having a contactless parameter in the card set and the card selected by the user are in the conflicting state.

3. The method of claim 1, wherein determining the at least one card which has no conflict with the selected card in the card set comprises:
determining all cards which have no conflict with the selected card in the card set as the at least one card.

4. The method of claim 1, wherein determining the at least one card which has no conflict with the selected card in the card set comprises:
displaying to the user remaining cards in the card set, wherein a card having a conflict with the selected card in the remaining cards is set to be a non-selectable state; and
determining a card selected by the user in the remaining cards as the at least one card.

5. The method of claim 1, wherein adding the at least one card and the selected card into the NFC smart card comprises at least one of:
determining scenario token information corresponding to a card to be added, and adding the scenario token information into the NFC smart card of the user; or
receiving card information of the card to be added input by the user, and adding the card information into the NFC smart card of the user.

6. The method of claim 1, wherein after adding the at least one card and the selected card into the NFC smart card, the method further comprises:
performing communication with the card reading device through a card in the NFC smart card.

7. The method of claim 6, further comprising:
after performing communication with the card reading device through the card in the NFC smart card, feeding back the card to the user.

8. A device for configuring a Near Field Communication (NFC) smart card, comprising:
a processor; and
a memory configured to store an instruction executable by the processor;
wherein the processor is configured to:
receive a card selected by a user, the card being included in a card set corresponding to the user;
acquire label information corresponding to the card set, wherein the label information represents at least one of a conflicting state or a non-conflicting state between every two cards in the card set, and wherein the label information is generated by a server according to contactless parameters of cards in the card set and is sent to the device;
determine, according to the label information sent by the server, whether there is a conflict between every two cards in the card set;
determine at least one card which has no conflict with the selected card in the card set, the at least one card being different from the selected card; and
add the at least one card and the selected card into the NFC smart card, wherein each card in the NFC smart card is in an activated state,
wherein in receiving the card selected by the user, the processor is further configured to:
acquire scene information of a present scene based on NFC communication between the device hosting the NFC smart card and a card reading device, and determine a card corresponding to the scene information in the card set according to the acquired scene information as the selected card.

9. The device of claim 8, wherein the label information further comprises at least one of:
when the card selected by the user has a contactless parameter, label information for representing that a card having the contactless parameter in the card set and the card selected by the user are in the non-conflicting state;
when the card selected by the user has a contactless parameter, label information for representing that a card having a different contactless parameter from the contactless parameter in the card set and the card selected by the user are in the conflicting state;
when the card selected by the user has no contactless parameter, label information for representing that a card having no contactless parameter in the card set and the card selected by the user are in the non-conflicting state; or when the card selected by the user has no contactless parameter, label information for representing that a card having a contactless parameter in the card set and the card selected by the user are in the conflicting state.

10. The device of claim 8, wherein the processor is further configured to:
   determine all cards which have no conflict with the selected card in the card set as the at least one card.

11. The device of claim 8, wherein the processor is further configured to:
   display to the user remaining cards in the card set, wherein a card having a conflict with the selected card in the remaining cards is set to be a non-selectable state; and
   determine a card selected by the user in the remaining cards as the at least one card.

12. The device of claim 8, wherein the processor is further configured to perform at least one of:
   determining scenario token information corresponding to a card to be added, and adding the scenario token information into the NFC smart card of the user; or
   receiving card information of the card to be added input by the user, and adding the card information into the NFC smart card of the user.

13. The device of claim 8, wherein the processor is further configured to:
   after adding the at least one card and the selected card into the NFC smart card, perform communication with the card reading device through a card in the NFC smart card.

14. The device of claim 13, wherein the processor is further configured to:
   feed back the card to the user after the communication with the card reading device is performed.

15. A non-transitory computer-readable storage medium having stored thereon a computer instruction that, when executed by a processor, causes the processor to perform a method for configuring a Near Field Communication (NFC) smart card, the method comprising:
   receiving a card selected by a user, the card being included in a card set corresponding to the user;
   acquiring label information corresponding to the card set, wherein the label information represents at least one of a conflicting state or a non-conflicting state between every two cards in the card set, and the label information is generated by a server according to contactless parameters of cards in the card set and is sent to an electronic device hosting the NFC smart card;
   determining, according to the label information sent by the server, whether there is a conflict between every two cards in the card set;
   determining at least one card which has no conflict with the selected card in the card set, the at least one card being different from the selected card; and
   adding the at least one card and the selected card into the NFC smart card, wherein each card in the NFC smart card is in an activated state,
   wherein receiving the card selected by the user comprises:
   acquiring scene information of a present scene based on NFC communication between the electronic device hosting the NFC smart card and a card reading device, and determining a card corresponding to the scene information in the card set according to the acquired scene information as the selected card.

* * * * *